Aug. 23, 1932.  J. A. BALL  1,873,259
COLOR CINEMATOGRAPHIC APPARATUS
Filed Oct. 15, 1929
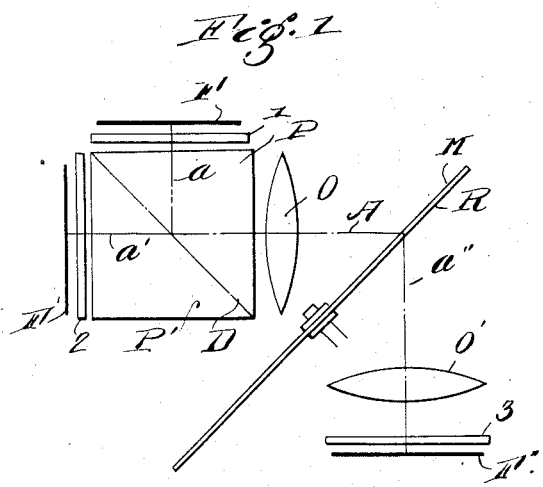
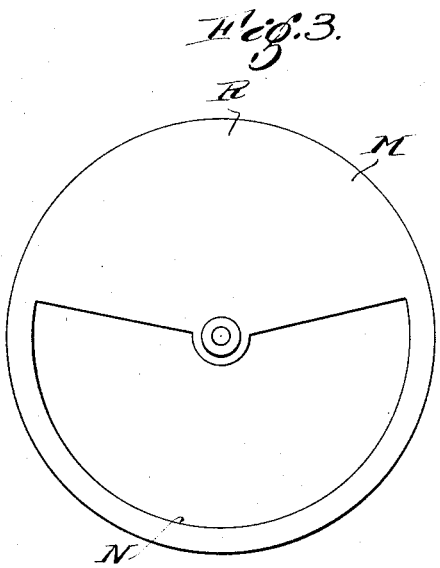
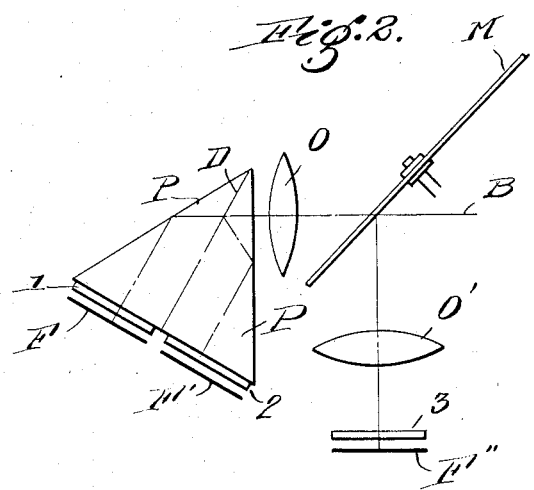
Inventor
Joseph A. Ball,
by Roberts Cushman + Woodberry
his Attorneys Patented Aug. 23, 1932

1,873,259

UNITED STATES PATENT OFFICE

JOSEPH A. BALL, OF LOS ANGELES, CALIFORNIA, ASSIGNOR, BY MESNE ASSIGNMENTS, TO TECHNICOLOR, INC., OF NEW YORK, N. Y., A CORPORATION OF DELAWARE

COLOR CINEMATOGRAPHIC APPARATUS

Application filed October 15, 1929. Serial No. 399,741.

While cameras have been successfully developed for commercially making two series of complementary color records on either the same or separate films for two-color cinematography, serious difficulties have been encountered in producing a successful camera for exposing three or more complemental series of records which may be separately reproduced for subtractive projection. For example, the use of more than one light-dividing surface or partial reflector results in a serious loss of light for the second and third color records; and the use of a single film with the three images of each complemental set distributed longitudinally of the film is impractical because of the excessive speed required to advance the film three picture spaces between each set of exposures.

Objects of the present invention are to overcome the difficulties which have heretofore blocked the development of a successful camera for the aforesaid purpose and to provide a method and apparatus for producing three or more complemental records which may be reproduced in superposition without noticeable color fringes.

For the purpose of illustrating the genus of the invention two concrete embodiments are shown in the accompanying drawing in which Fig. 1 is a diagrammatic view in side elevation of one optical system;

Fig. 2 is a similar view of an alternative system; and

Fig. 3 is an elevation of the reflecting shutter in Figs. 1 and 2.

The particular embodiment shown in Fig. 1 comprises an objective lens O, a prism set comprising two prisms P and P' with a light-dividing surface D therebetween for dividing the main beam of light along optical axis A into two similar component beams along the branch paths $a$ and $a'$, two filters 1 and 2 for filtering the light in the paths $a$ and $a'$ respectively, a revolving shutter having an opening N for transmitting light along the optical axis A during approximately one-half revolution (more or less) and a reflecting surface R for reflecting light during the remainder of each revolution along path $a''$, another objective O' and a third filter 3, whereby film at F, F' and F" may be exposed with light of three different colors or characteristic hues, for example, red, green and blue. The modification shown in Fig. 2 is similar to that shown in Fig. 1 except in that the prism unit is of the type described and claimed in Patent No. 1,497,356.

By exposing the film at F and F' to the red and green components of the light, the red and green records will register exactly inasmuch as they are exposed simultaneously along identical paths both in glass and in air; and by exposing the film F" to the blue component the tendency to color fringing due to the fact that this exposure is not simultaneous with the other two will not be noticeable for the reason that the blue record, which is colored yellow in the final picture, does not contribute largely to the definition of the picture. While the colors red, green and blue have been referred to for the purpose of illustration, it will of course be understood that any combination of colors may be employed, as for example red-orange, blue-green, and blue-violet.

From the foregoing it will be evident that pairs of records representing two color aspects are formed at F and F' from the same point of view along like optical paths that the third series of records is formed at F" representing a different color aspect, the exposures at F" alternating with those at F and F'. Obviously when using the apparatus for exposing cinematographic film the films may be advanced intermittently with any suitable mechanism and, while auxiliary shutters may be used in the various branch paths if desired, the reflecting shutter M may be used alone, in which case the film F" is advanced while the films F and F' are being exposed and vice versa.

I claim:

1. Apparatus for making three-color cinematographic pictures comprising means for simultaneously exposing, from the same point of view and along optically like paths, records of series of complemental images representing two color aspects, means for shuttering light along said paths between successive exposures, and means for exposing, during the intervals when said paths are shuttered, records of a third series representing a different color aspect.

2. Apparatus for making three-color cinematographic pictures comprising means for simultaneously exposing, from the same point of view and along optically like paths, records of series of complemental images representing red and green aspects, means for shuttering light along said paths between successive exposures, and means for exposing, during the intervals when said paths are shuttered, records of a third series representing a blue aspect.

3. Apparatus for making three-color cinematographic film comprising means for simultaneously exposing, from the same point of view and along a branched path, records of series of complemental images representing two color aspects, a movable reflector for deflecting light from said path between successive exposures, and means in the path of the deflected light for exposing, during the intervals when said branched path is shuttered by said reflector, records of a third series representing a different color aspect.

4. Apparatus for making three-color cinematographic pictures comprising means for simultaneously exposing, from the same point of view and along optically like paths, records of series of complemental images representing two color aspects on the same film, means for shuttering light along said paths between successive exposures, and means for exposing, during the intervals when said paths are shuttered, records of a third series representing a different color on another film.

5. Apparatus for making three-color cinematographic film comprising means for simultaneously exposing, from the same point of view and along a branched path, records of series of complemental images representing two color aspects, said means including a prism unit having a central partial-reflecting surface and total-reflecting surfaces respectively positioned in the branches of said paths symmetrically to the partial-reflecting surface, a movable reflector for deflecting light from said path between successive exposures, and means in the path of the deflected light for exposing, during the intervals when said branched path is shuttered by said reflector, records of a third series representing a different color aspect.

6. Apparatus for making three-color cinematographic pictures comprising means for simultaneously exposing, from the same point of view, records of series of complemental images representing two color aspects, means for shuttering the exposure light between successive exposures, and means for exposing, during the shuttering intervals, records of a third series representing a different color aspect.

7. Apparatus for making three-color cinematographic film comprising means for simultaneously exposing, from the same point of view along an optical path, records of series of complemental images representing two color aspects, a movable reflector for deflecting light from said path between successive exposures, and means in the path of the deflected light for exposing, during the intervals when said first path is shuttered by said reflector, records of a third series representing a different color aspect.

Signed by me at Boston, Massachusetts this eleventh day of October, 1929.

JOSEPH A. BALL.